(12) United States Patent
Bonini, III

(10) Patent No.: US 11,812,782 B1
(45) Date of Patent: Nov. 14, 2023

(54) SYSTEM, METHOD AND DEVICES FOR MONITORING HUMIDITY IN A HUMIDOR

(71) Applicant: Frank J Bonini, III, Bryn Mawr, PA (US)

(72) Inventor: Frank J Bonini, III, Bryn Mawr, PA (US)

( * ) Notice: Subject to any disclaimer, the term of this patent is extended or adjusted under 35 U.S.C. 154(b) by 0 days.

(21) Appl. No.: 17/581,214

(22) Filed: Jan. 21, 2022

(51) Int. Cl.
*A24F 25/02* (2006.01)
*G01D 21/00* (2006.01)
*H04L 67/12* (2022.01)
*H04W 4/38* (2018.01)

(52) U.S. Cl.
CPC .............. *A24F 25/02* (2013.01); *G01D 21/00* (2013.01); *H04L 67/12* (2013.01); *H04W 4/38* (2018.02)

(58) Field of Classification Search
CPC ......... A24F 25/02; G01D 21/00; H04L 67/12; H04W 4/38
See application file for complete search history.

(56) References Cited

U.S. PATENT DOCUMENTS

| | | | | |
|---|---|---|---|---|
| 6,116,029 A | * | 9/2000 | Krawec | .................... F25B 21/02 62/3.4 |
| 6,157,306 A | * | 12/2000 | Mularoni | ............. G08B 21/182 206/242 |
| 9,940,804 B2 | | 4/2018 | Bean et al. | |
| 10,568,034 B2 | | 2/2020 | Bean et al. | |
| 2007/0012796 A1 | * | 1/2007 | Pohl | ......................... A24F 25/02 239/34 |
| 2008/0231459 A1 | * | 9/2008 | Corder | .................... G07C 5/008 340/572.7 |
| 2016/0205193 A1 | * | 7/2016 | Bommer | .................. H04L 67/12 370/254 |
| 2017/0038325 A1 | * | 2/2017 | Takashima | .......... G06K 19/0702 |
| 2018/0313556 A1 | * | 11/2018 | Seo | ......................... H02J 50/15 |
| 2021/0248568 A1 | | 8/2021 | Bean et al. | |
| 2021/0273617 A1 | * | 9/2021 | Yu | .............................. H03F 3/19 |

* cited by examiner

*Primary Examiner* — James J Yang
(74) *Attorney, Agent, or Firm* — Bonini IP Law, LLC; Frank J. Bonini, Jr.

(57) ABSTRACT

A system, method and devices for monitoring the humidity of a containment implemented in a humidor. A sensor is electronically coupled with a first coil to receive power wirelessly from a compatible second coil of a controller. The sensor may display the sensor readouts on a display and/or may communicate the information wirelessly to the controller or to another device. The sensor is placed within the containment, and the controller coil outside of the containment, or in some operably spaced apart manner (i.e., within the coil radiance or signal range) from the sensor to provide power to the sensor. The sensor does not require batteries, and the humidor may remain closed while sensor readings are ascertained and during the monitoring.

24 Claims, 11 Drawing Sheets

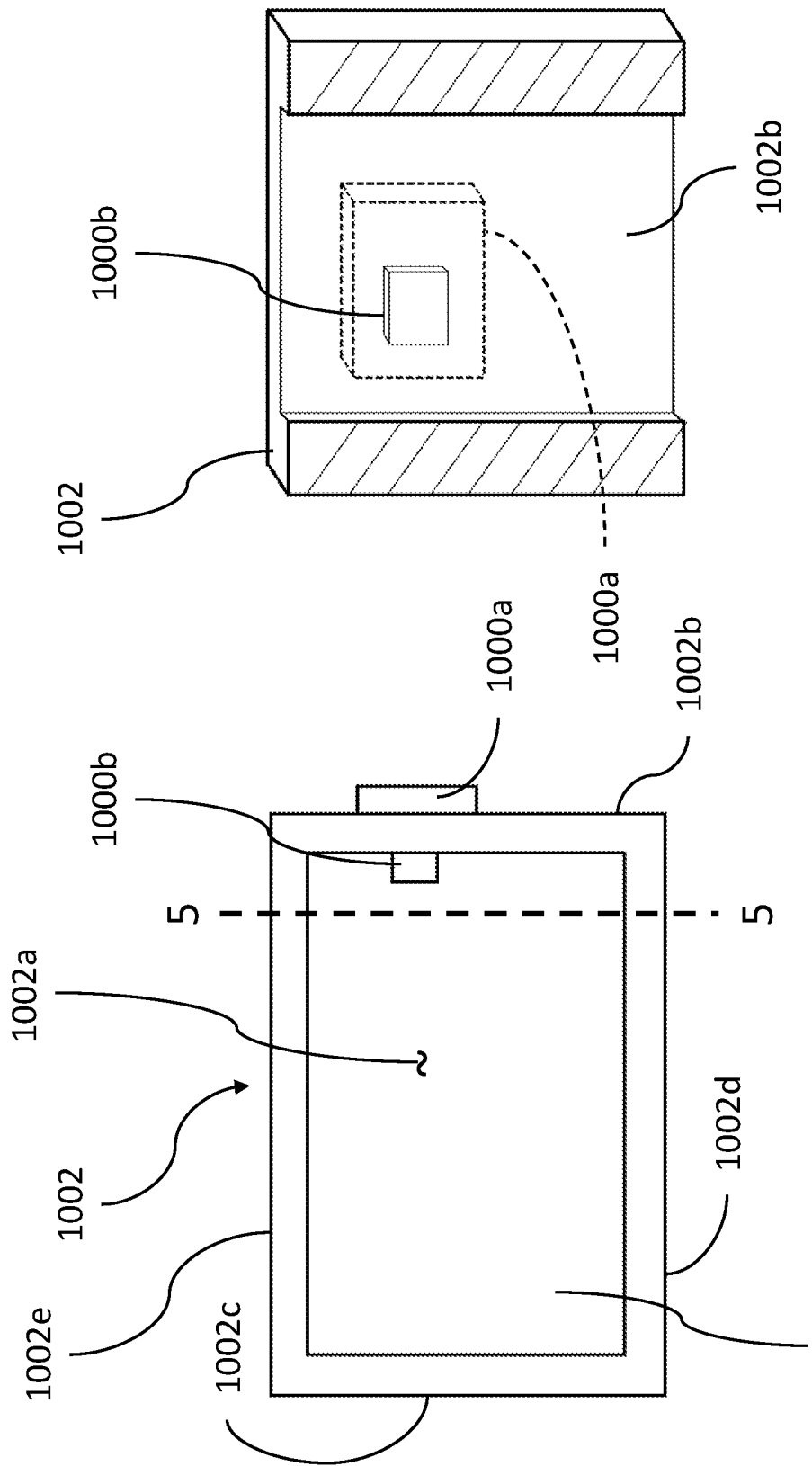

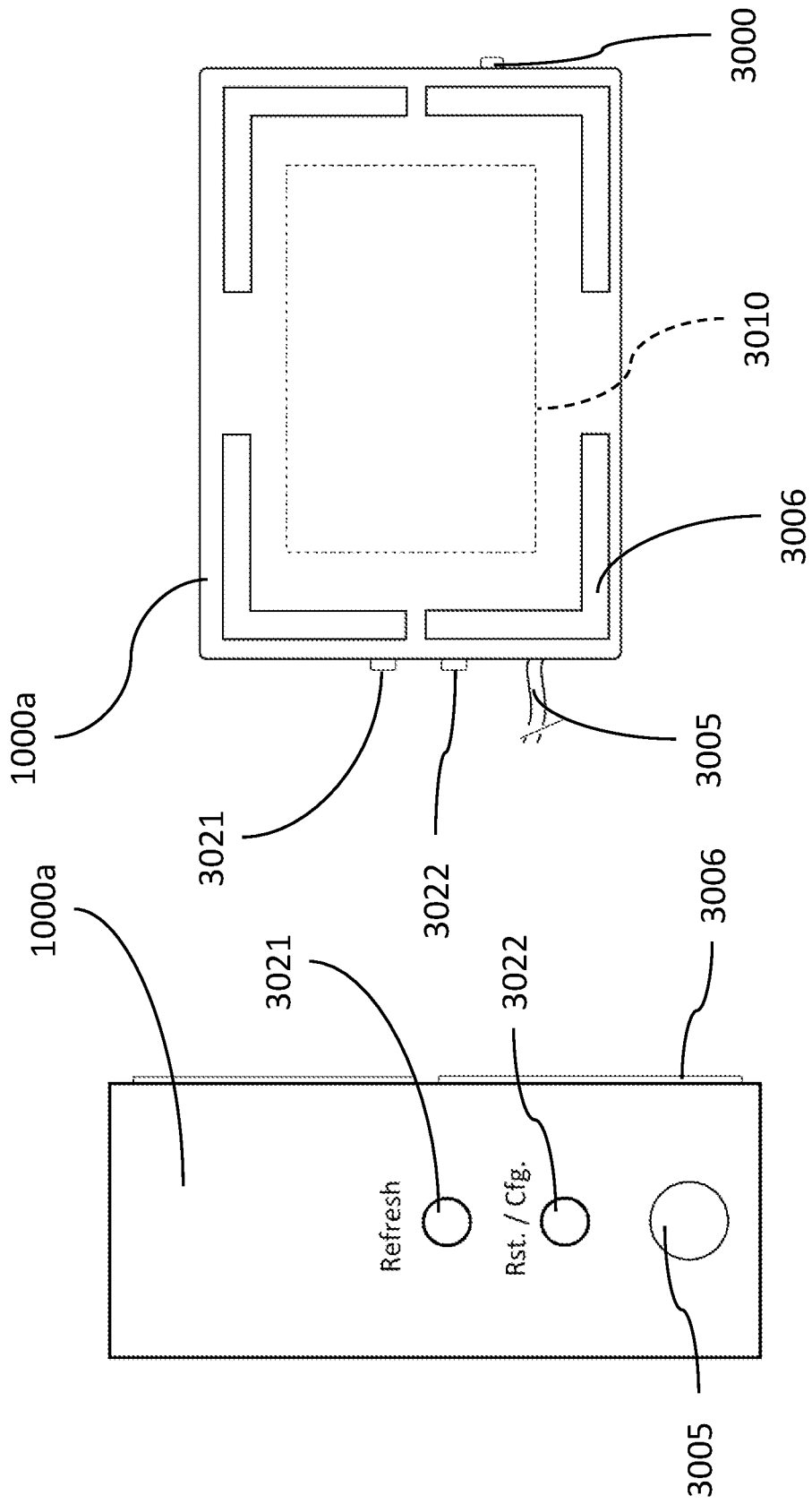

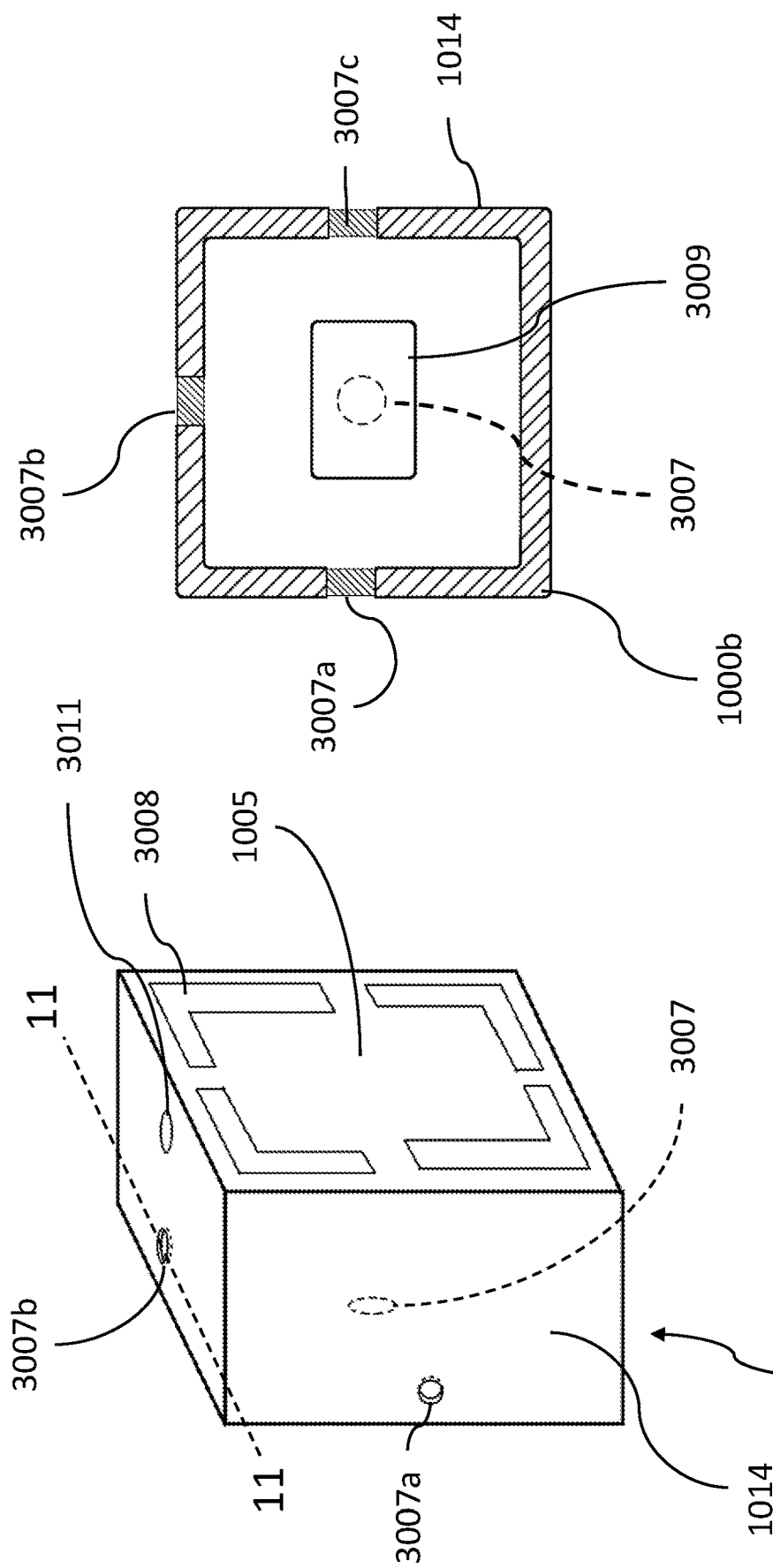

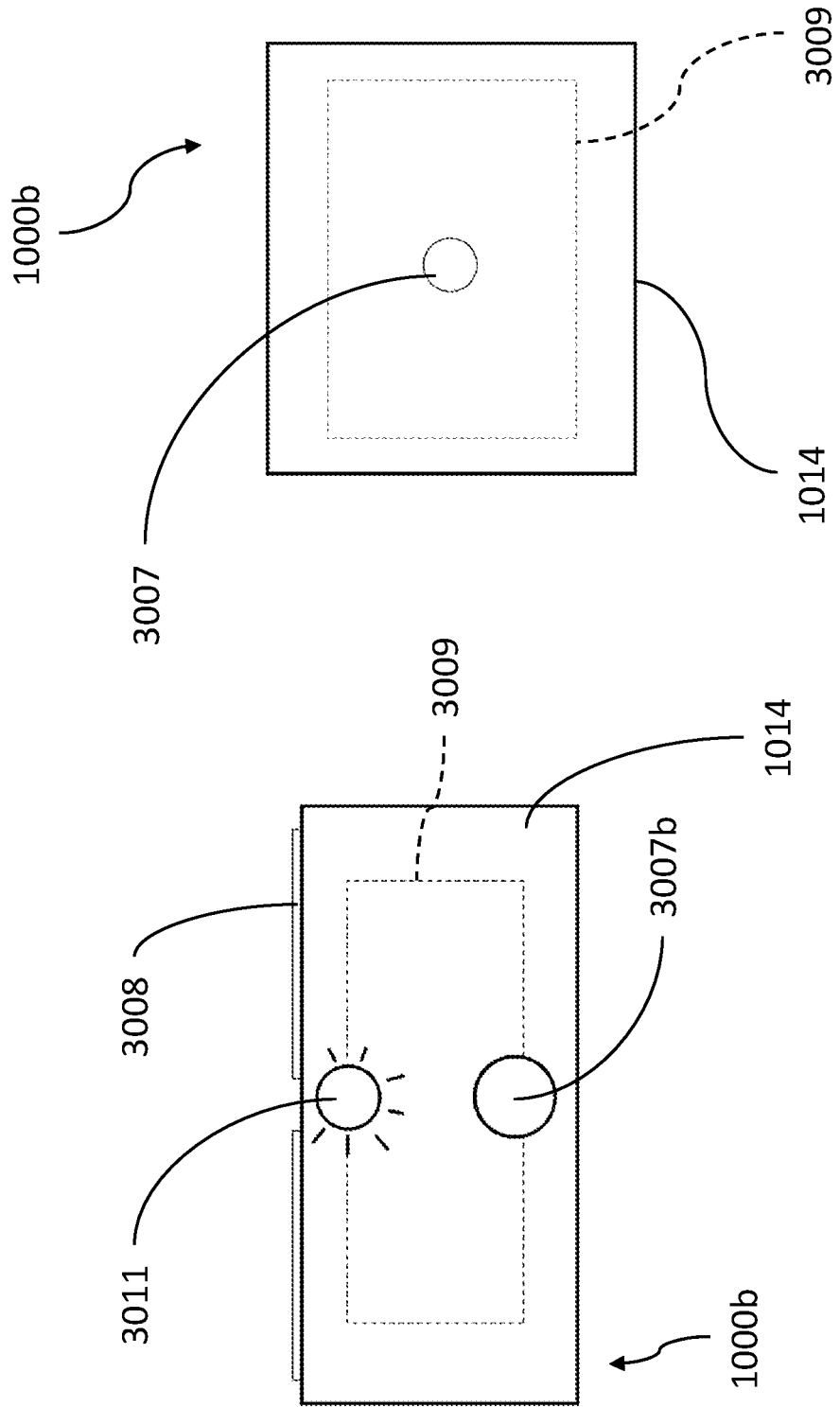

SYSTEM, METHOD AND DEVICES FOR MONITORING HUMIDITY IN A HUMIDOR

BACKGROUND OF THE INVENTION

1. Field of the Invention

The present invention relates to the field of humidors for storing tobacco and tobacco products, and more particularly to a system and devices for monitoring internal humidity levels of a humidor when products, such as tobacco products are stored therein.

2. Brief Description of the Related Art

Humidors have been long known and widely used for storing tobacco and tobacco products. One common product stored in humidors is a cigar. Humidors typically are structured with an internal space or cavity in which a number of cigars may be stored. The cigars often are piled together, and, in some instances a humidor may have one or more dividers, to segregate the internal space into two or more compartments. Humidors typically are constructed from wood, which retains and regulates moisture. For example, Spanish cedar is one type of wood from which a humidor or its internal cavity may be formed. In some instances, the cedar may be applied to line the internal cavity of the humidor, and other materials, including other woods, may be used for the humidor. The humidor retains the cigars stored therein in a suitable humidity environment, which typically may be about 65 to 72% relative humidity, to extend the cigar shelf life, and to provide a beneficial amount of humidity for improved consumption.

Humidors typically are humidified by using a water or chemical containing element, such as, for example, a sponge, reservoir, gels, beads, and the like. These humidifier products may include water in a mixture with a protector or inhibitor, such as for example, glycol, to prevent bacterial and/or mold formation. A sponge-like element or bead may be used to take up the mixture and release water when the humidity environment has decreased, and take up water when there is excess humidity. For example, a solution of propylene glycol is designed to attempt to regulate humidity to a particular level, such as, for example, 70%. Other examples of humidity regulation are products that are formulated with a semipermeable membrane that surrounds a chemical compound therein, which may be certain salts mixed with water to regulate humidity at a particular level (e.g., 65%, 68%, 70% etc.). Some humidification products include battery or electric devices with a water or solution reservoir that is provided to provide humidification.

Often, an instrument for measuring humidity, called a hygrometer, is installed within the humidor to provide an indicator of the humidity level within the humidifier. Some hygrometers may be adhered to the lid or wall of the interior of the humidor, while others may be placed on the floor, shelf or surface of the humidor. Where a humidor has a glass window, e.g., such as in the lid, the hygrometer may be placed at a suitable location so it may be viewed through the window. In other instances, where the humidor has solid or opaque walls (and lid), the humidor may be opened to view the hygrometer. Still other humidors include a port into which a hygrometer is set, and preferably sealed with a gasket. The hygrometers typically may be analog or digital devices, which provide a dial reading or a digital readout. Typically, the hygrometers take up space, and, in some cases, reduce the capacity of the humidor.

Regardless of the humidifier used, a humidor may fail to maintain desired humidity. This can be for a number of reasons. For example, the humidifier lid or door may become damaged or fail to seal, the hygrometer installed may not have a seal around it, or the seal may wear or not provide a suitable barrier.

In some instances, a collection of cigars can be expensive, and it is often desirable to maintain the cigars for extended periods of time, as some consider the resting of a cigar to benefit in terms of flavor profiles as well as evenness of a burn. It is therefore important to know and ensure that the cigars are maintained at a constant humidity, which is often a desired humidity number or range. A need exists for a way to monitor the condition within a humidor in an accurate manner and in a way that will maintain the benefits of the containment environment in which the cigars are stored.

SUMMARY OF THE INVENTION

A system, method and device for regulating humidification of a cigar humidor is provided. According to an aspect of the invention, a system and devices are provided for measuring the humidity within a humidor. The device includes a hygrometer which is positioned to measure the moisture content, i.e., humidity, within the humidor. The hygrometer preferably comprises a detection component for detecting moisture. The detection component preferably comprises a hygroscopic sensor. The hygrometer is electronically connected with a transmitting component to transmit the humidity information to a computing device. The computing device may be a computer, or a mobile computing device, such as, for example, a phone, tablet, PDA, and preferably is configured to receive information that includes the humidity within the humidor. Humidity readings may be read in real-time and communicated to the controlling unit, or may be communicated at intervals (or near real-time). According to preferred embodiments, the hygrometer preferably is configured to provide the humidity information of the environment within humidor through a wireless connection made to a network component, such as, for example, an access point, router, node, and may be communicated through a wireless protocol such as WiFi, Bluetooth, or other wireless communication mechanism. Alternatively, according to some embodiments, the humidity information of the environment within humidor may be communicated through a direct wireless connection to a computing device.

Embodiments of the system and devices may comprise a sensor electronically coupled with a first coil to receive power wirelessly from a compatible second coil (controller coil), and the sensor also may display the sensor readouts on a display. Preferred embodiments are implemented with or may be configured as a humidor. Optionally, there is wireless communication in the sensor that is configured to communicate the sensor information for readout on a device, which may be a device other than the optional sensor display. The sensor is placed within a containment, and the controller coil outside of the containment, or in some operably spaced apart manner (i.e., within the coil radiance or signal range) from the sensor. According to some implementations and embodiments, a containment may include two compartments, one for a coil controller and the other for a sensor. For example, the coil controller and sensor could be in a containment but separated by a wall or panel.

The system and device according to some embodiments provide a hygrometer which preferably is configured to be positionable within the humidor and transmits through the existing humidor walls and structure. According to preferred embodiments the hygrometer sensor is powered without the requirement for batteries, allowing placement of the hygrometer sensor within the humidor without having to open the humidor to change batteries. The sensor is powered through a wireless powering circuitry through an associated controller which preferably resides on the exterior of the humidor, while the hygrometer sensor remains within the humidor. The sensor receives power wirelessly, and also sends and receives signals, including the humidity conditions as well as temperature, using the wireless power to carry out the functions.

The hygrometer preferably comprises a sensor unit that includes a sensor that measures moisture and is configured to provide the information to an associated component that transmits the information, for example, through a network to a remotely situated computing component, such as, a mobile device. According to preferred embodiments, the controlling unit may be positioned outside of the humidor, and may comprise a controller that controls and powers a sensor. A sensor unit may be configured with a sensor, and the controlling unit may receive data from the sensor. Associated circuitry also is provided in the sensor unit and controlling unit. According to some embodiments, the hygrometer sensor is actuated by the controller to provide a humidity reading via a signal. The signal may be obtained by or provided to the controlling unit from the sensor unit. The controlling unit may include a transmission element for transmitting the humidity information to a computer or a remote component. The humidity information may comprise a signal that is transmitted through the Internet, WiFi, LAN, WAN, VPN or other network, to a remote device that is configured to display the humidity and/or process the information for storage or other usage. The signal may comprise humidity data from the sensor within the humidor. Embodiments of the device may be configured to receive, store and process data in accordance with instructions, which may be provided in software containing the instructions. The software and instructions may be on the sensor unit, the controlling unit, or both; or in addition, or alternatively, may be provided on a remote computing device that is to receive the signal data that the sensor and/or controlling unit relays. The humidity levels sensed by the sensor may be stored throughout periodic intervals and may be made available to review and recall at a later time. According to some embodiments, the devices and system may provide real-time or near real-time processing and monitoring of the humidity condition within the humidor so a viewer may view it. For example, a user may monitor conditions when an adjustment is made to the humidor, such as the addition of cigars or other content (addition of water or other humectant), so the user can ensure or monitor the hygrostatic equilibrium (which may be a matter of minutes, hours or days). In addition, the system and devices also may indicate when the humidor has been opened, or if a seal has failed or leaks (e.g., such as the humidor cover and body), or other event that would affect the humidity level.

Embodiments of the system and devices may provide a software application that is operable on a computing device, such as, for example, a smartphone, tablet or other device, which allows a user to view the humidity level of the humidor on the device display. The software may contain instructions for detecting and determining threshold levels, which may be set or preset, for humidity levels (e.g., high, low, desired), and also for generating alerts, which may be communicated, displayed, sounded (i.e., audible), or coupled with an alarm mode or tone. In addition, the system and devices may be configured to communicate the humidity information to one or more other devices. For example, devices that generate humidity or remove humidity from the air may be operated in conjunction with the wirelessly powered sensor, to operate to regulate humidity within the containment, such as the humidor, based on the information provided by the sensor. According to some alternate embodiments, the system is configured to lift the lid to provide an opening when the interior may be equilibrated by exposure to the exterior or ambient humidity.

The system and devices may be configured for application to an existing humidor, or alternately, a humidor may be provided with the humidification system. Alternatively, a humidor may be provided that is prepared to receive the sensor within a wall space, or where the sensor is disposed within the humidor wall. The sensor may be placed within a humidor, and the sensor controller positioned or mounted on the exterior of the humidor, and preferably, within proximity of the sensor, so that the controller may power the sensor wirelessly, as well as receive or exchange information with the sensor. According to some preferred embodiments, the controlling unit may be removably mountable or connectable to the humidor. Embodiments also may provide a sensor unit that is removable. The controlling unit and sensor unit may be provided for use with an existing humidor, or commercially available humidors, while according to other embodiments, the invention provides a humidor configured with one or more of the sensor or controller.

According to some alternate embodiments the sensor unit may be provided within the humidor wall to be partially or wholly within the wall thickness (with one or more openings for communication with the humidor interior). A slot or panel may be provided in the humidor wall to receive the sensor unit. According to some embodiments, a humidor is provided having a space within a wall (or bottom or cover) that is configured to receive the sensor unit. Alternatively, a holder may be provided or the sensor unit may be configured within a holder that first within the space of a humidor wall, bottom or cover, and secures therein.

The devices such as the controller unit and sensor unit may include a screen or other display, such as a panel or window, that displays a reading of the sensed condition, such as the humidity that the sensor unit determines (e.g., 68.4%). The display panel associated with the sensor unit may be provided on the sensor unit housing, and a display may be provided on the controller unit housing. The display may also display other indications, such as temperature, and/or time, date (e.g., a clock).

According to some alternate embodiments, a display panel may be located at other locations on the humidor, and connected to display the sensed humidity condition of the humidor interior.

Embodiments of the invention may provide a humidor which retains one or more, or multiple layers of cigars for efficient storage, and which includes one or more of the above features. Alternatively, the controller unit and sensor system of the invention may include or be used in conjunction with humidors of different sizes, including smaller and larger humidors.

Embodiments of the invention may provide a humidor that is sturdy, attractive, and economical to manufacture, and includes one or more of the above features.

According to some preferred embodiments, a computing component is provided and configured with instructions for managing information and storing information. A user may implement the system and carry out the method using a personal computing device such as, for example, a tablet, smartphone or other personal computing device. A personal computer also may be used. The computing component preferably includes a processor, which may be a microprocessor or circuitry including a processing component. The smartphone or tablet may be configured by installing software on the device that contains instructions for managing information. This may be carried out for one or more humidors in which the cigars are stored, or may be provided without regard to the humidor. Preferably, each humidor in which the user may store cigars may be tracked separately as to its contents, and an inventory may be recorded and maintained as cigars are added to or removed from the humidor. The humidity conditions of the humidor also may be monitored and stored, and correlated with changes made to the humidor, such as adding humectant, or adding or removing cigars.

The sensor is configured to monitor humidity, and according to some alternate embodiments may be configured to monitor temperature. A temperature sensor may be included in conjunction with the hygrometer sensor, or may be separately provided and configured as part of the internal sensor or detecting device or circuitry.

The devices preferably may be configured to report the information sensed by the sensor over a network. Embodiments provide networking capabilities, such as a transceiver, antenna or WiFi capabilities for integration with a software application that handles the data from the sensor. For example, the humidity condition within the containment, such as the humidor, may be monitored over a time period (minutes, days, months), and can be stored and saved. In addition, the software is configured to process the information from the sensor to determine when a threshold condition, such as too low or too high humidity/temperature is present, and provide a warning. According to some embodiments, where a regulating device, such as a humidifier/dehumidifier is provided, the sensed condition may be used to control the operation of the humidification/dehumidification device, so as to regulate the humidity in the containment (e.g., the humidor) to the desired level.

These and other advantages may be provided by the invention.

BRIEF DESCRIPTION OF THE DRAWING FIGURES

FIG. 4 is an illustration of exemplary implementation of the system in a humidor.

FIG. 5 is a sectional view of the humidor of FIG. 4, taken along the section line 5-5 of FIG. 4.

FIG. 8 is a right side-view of the controller unit.

FIG. 9 is a rear elevation view of the controller unit.

FIG. 10 is a perspective view of the sensor unit, as viewed looking at the mounting side of the unit.

FIG. 11 is a sectional view of the sensor unit, depicting the inside, and being taken along the section line 11-11 of FIG. 10.

FIG. 12 is a top plan view of the sensor unit.

FIG. 13 is a front elevation view of the sensor unit.

DETAILED DESCRIPTION OF THE PREFERRED EMBODIMENTS

Figure 1:
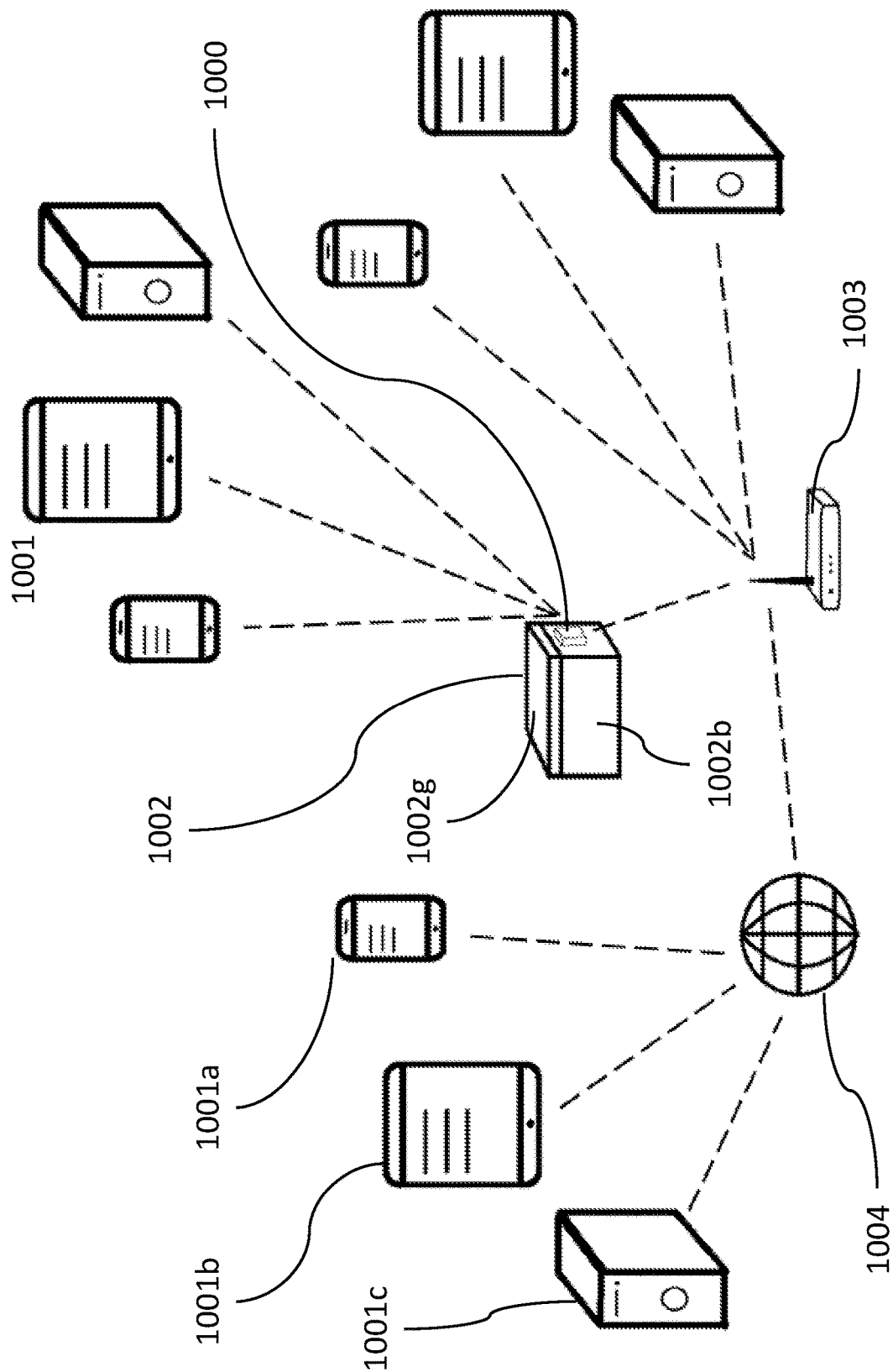
FIG. 1 is a depiction of an exemplary network setup with the device.
Figure 2:
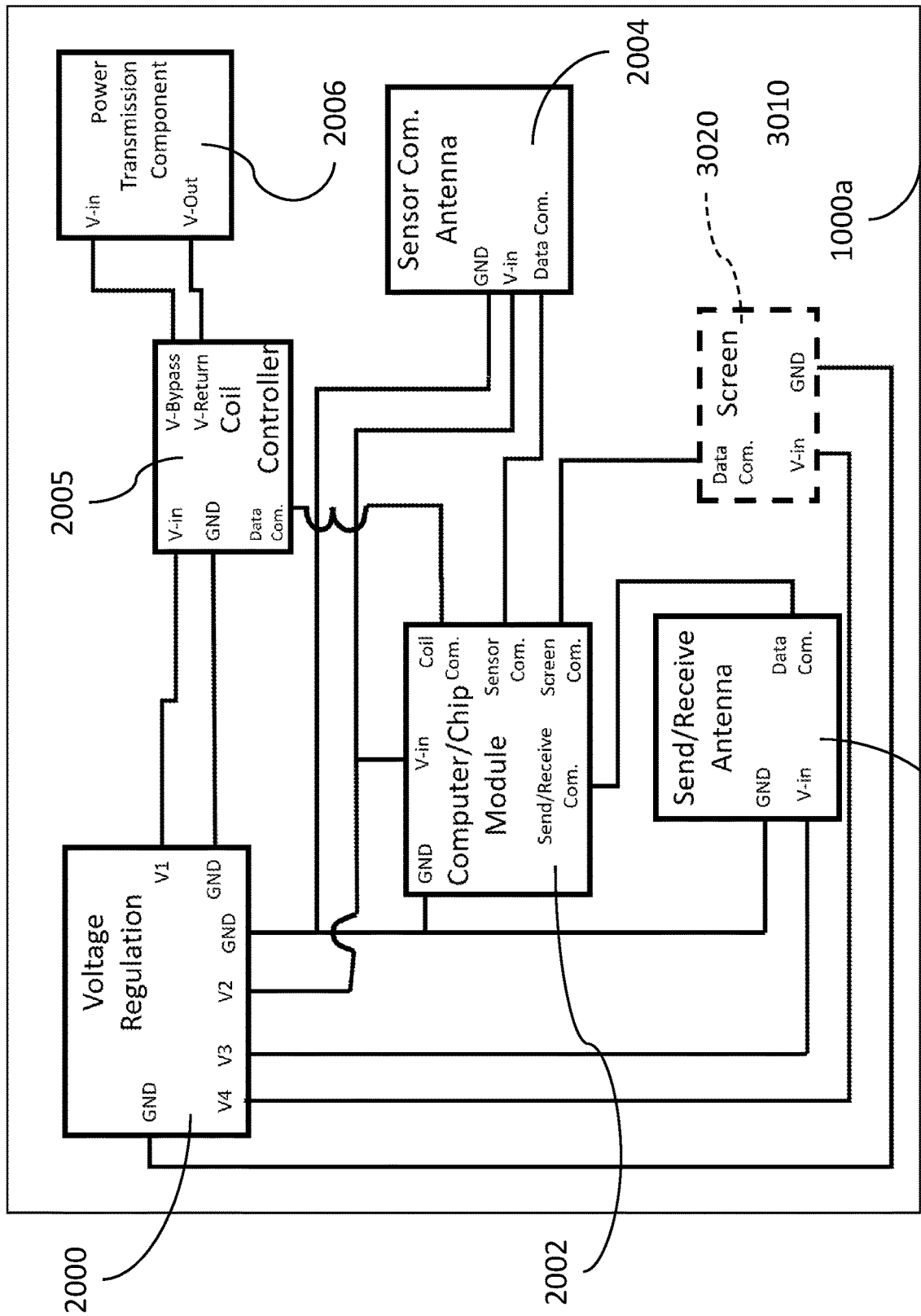
FIG. 2 is a schematic illustration of the controller unit showing a preferred embodiment of the controller circuitry configuration.
Figure 3:
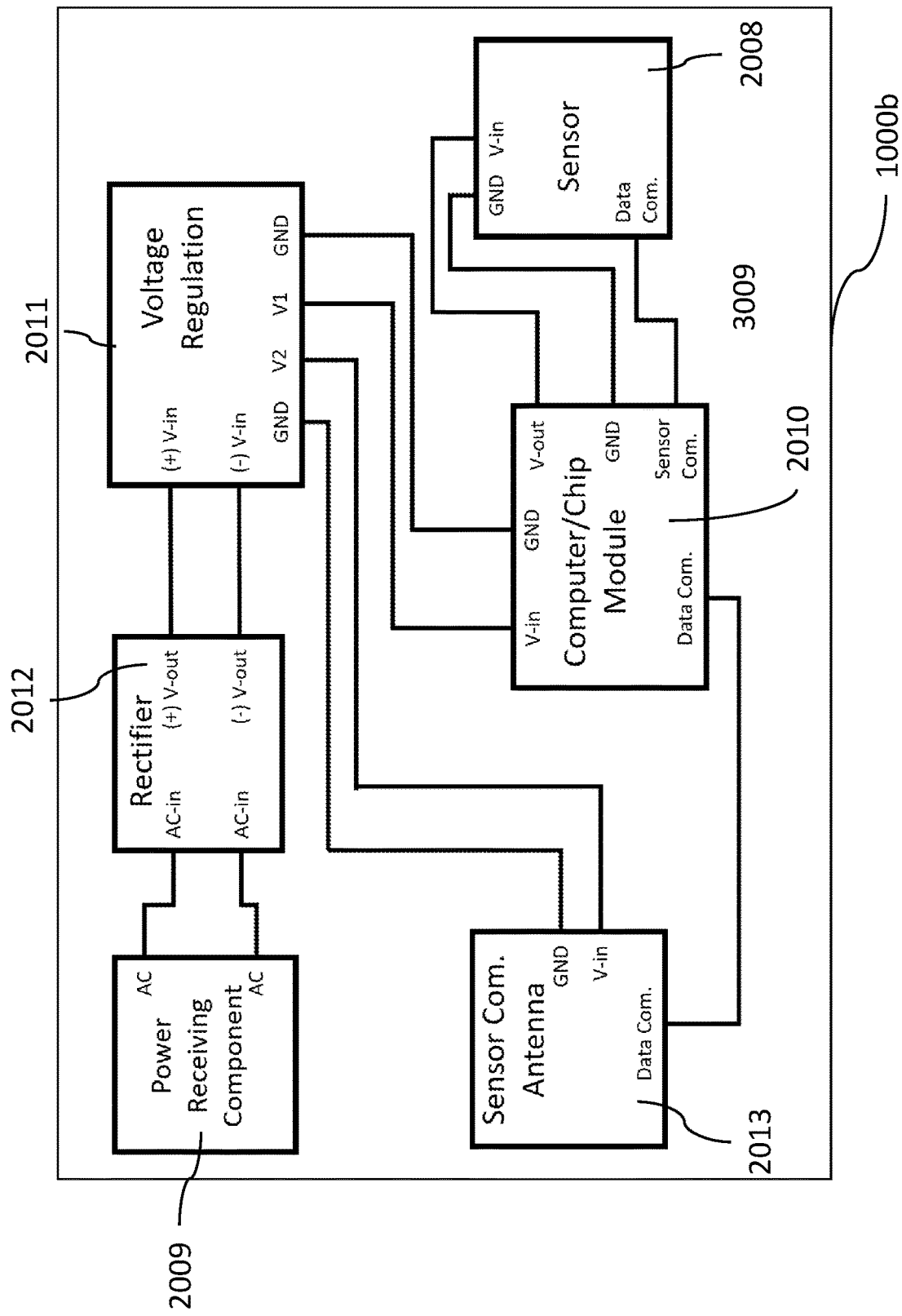
FIG. 3 is a schematic illustration of the sensor unit showing a preferred embodiment of the sensor circuitry configuration.

A system for monitoring a hygroscopic condition within a containment is provided. Referring to FIGS. 1-3 the system is illustrated comprising a sensor unit 1000b with circuitry that contains a sensor 2008 and a coil 2009 (FIG. 3) for receiving wireless power from a controller unit 1000a that when positioned proximate to the sensor unit 1000b powers the sensor circuitry and the sensor functions. The sensor unit 1000b is configured to provide wireless communications to report the data sensed by the sensor 2008 so that the humidity inside the humidor 1002 may be monitored. The system is illustrated in an exemplary embodiment with a humidor 1002, where the sensor unit 1000b is disposed inside the humidor and the controller unit 1000a is disposed outside of the humidor 1002 and adjacent to the sensor location to provide wireless power to the sensor. The sensor unit 1000b does not require batteries, and one is not required to open the humidor in order to obtain the readings or to provide power to the sensor unit 1000b. The monitoring may be carried out locally by reading the display associated with the device, such as on the controller unit 1000a (or sensor unit 1000b).

Referring to FIG. 1, a system, method and devices for monitoring the hygroscopic condition of a humidor are illustrated according to a preferred implementation in conjunction with a computing component or device which, in the embodiment depicted, is a smartphone 1001a. An application, such as a software application, preferably is provided on the smartphone 1001a, and may be configured to receive inputs from a user, and according to preferred embodiments, may be configured to receive information about the conditions of the humidor 1002. The humidor information may be associated with an identification of the humidor, which the user may name through the use of the application to assign a unique reference, such as a name, number, character or combinations thereof (See FIG. 15). Humidor information may also include properties of the humidor, such as, for example, humidity, temperature, and other measurable characteristics. The information is communicated to the computing device, such as, for example, the mobile phone or smartphone 1001a depicted in FIG. 1. The smartphone 1001a receives the information ascertained by the sensor unit 1000b (FIG. 4) disposed to sense humidity within the humidor 1002. Preferably, the hygrometer 1000b comprises an electronic component that provides a signal in response to the humidity sensed. The hygrometer or sensor unit 1000b in the embodiment shown is disposed within the humidor 1002 to sense humidity. The sensor unit 1000b provides information to a communication component, which in the embodiment illustrated, comprises a wireless transmitter, such as, for example, WiFi communication circuitry that transmits the information to the smartphone 1001a. The smartphone 1001a is provided with instructions to receive the hygrometer information, and preferably, the smartphone 1001a is provided with software that is configured with instructions to process and manage the information. The software preferably includes instructions for receiving and storing the hygrometer information, which identifies the humidity within the humidor 1002. The hygrometer information from the sensor unit 1000b is processed and made available for the user to view on the smartphone display screen 1001a (see FIG. 15). According to some embodiments, the hygrometer or sensor 1000b may be configured in a circuit where a signal from the smartphone 1001a is generated and communicated to the hygrometer control circuitry to activate the hygrometer circuitry to record the humidity sensed by the sensor and to communicate that reading or otherwise make the reading available to the smartphone application. The humidity may be stored and associated with a date and time taken, as well as the identification of the hygrometer circuitry associated with its containment (such as, for example, humidor no. 1). Alternatively, the hygrometer may be configured to report the signal to the computing device, such as the smartphone, periodically, such as real-time, near real-time, or at a predetermined or desired interval).

An exemplary embodiment of the system sensing device 1000 is shown in FIG. 1, and represented in FIGS. 2 and 3 depicting respectively, a controller unit 1000a and a sensor unit 1000b.

Referring to FIG. 2, a controller is shown comprising the controller unit 1000a which includes circuitry 3010 configured to power and operate the sensor unit 1000b (see FIGS. 3 and 4). According to preferred embodiments, the controller unit 1000a includes circuitry that operates and communicates with the sensor unit 1000b and the sensor circuitry 3009 (FIG. 3). In the exemplary embodiment illustrated, the controller circuitry 3010 is shown comprising a voltage regulator 2000, a computer/chip module 2002, an antenna for exchanges of wireless data transmission 2003, an optionally separate antenna 2004 for communication with a sensor 2008 in sensing component 1000b or solely therewith, and a wireless power transmission component 2006 which may be controlled and regulated by a regulator, such as the coil controller 2005. Though not shown, an oscillator and switch may be configured in conjunction with the coil controller 2005. The separate antenna 2004 may be optional where the antenna 2003 provides communications exchanges for wireless data exchanges with the sensor 2008. The embodied power transmission component, depicted comprising a coil 2006 may be used to provide power to the sensor unit 1000b by transmitting power to the sensor power receiving coil 2009 therein (FIG. 3). The controller power transmission component 2006 transmits power through wireless inductivity. The power transmission component 2006 preferably contains circuitry comprised of an electrical coil through which an oscillating current may flow. The frequency and amplitude of the current may be controlled by associated circuitry 3010 of the controller unit 1000a (FIG. 2), including the coil controller 2005. According to some embodiments, the coil controller 2005 contains an oscillator that may also be used in order to provide switching for the circuitry of the power transmission component or coil 2006. The frequency of the current switching may be regulated and controlled by the coil controller 2005. For the transmission of wireless power, the power transmission component 2006 of the controller unit 1000a and sensor power receiving component 2009 of the sensor unit 1000b each embody at least one electronic coil. According to preferred embodiments, the frequencies of oscillation in the respective transmission component circuitry (e.g., the circuitry 3010 of the controller 1000a) and receiving component circuitry (e.g., the circuitry 3009 of the sensor 1000b) are matched. For the transmission of power wirelessly, the transmission component 2006 (FIG. 2) and receiving component 2009 (FIG. 3) may utilize concepts of inductive resonance and embody circuitry that may be configured to oscillate at matching or resonant frequencies. The coil controller 2005 preferably embodies circuitry, and according to some embodiments, the circuitry allows characteristics of the power transmission component or coil 2006 to be altered in real-time, such as the frequency of the oscillating current flowing through the component or coil 2006 or the amplitude of the current. The coil controller 2005 may alter the aforementioned characteristics based on instructions contained in the software or circuitry provided in the computer/chip module 2002, where the instructions contain a method to adjust characteristics of the power transmission component or coil 2006 to achieve optimal power transmission. For example, the controller unit 1000a may be powered on by the user, and it may not initially detect sensor unit 1000b or a wireless connection thereto; it is possible that the respective power components, such as the coil 2006 and sensing component coil 2009 do not resonate at the same frequency (due to component tolerances, manufacturing inconsistencies, or other variations) or that they cannot establish a strong enough power connection (e.g., they are too far apart, or there is too much material between them, or the type of intermediary material). In the aforementioned case or situations, the coil controller 2005 may alter the following characteristic of the power transmission coil 2006 until a data connection with sensor unit 1000b can be established: The oscillation frequency may be altered by increments, positively and/or negatively until a connection is established. If a connection is established after having altered the frequency, the new frequency value may be saved and stored to the computer/chip module 2002 (FIG. 2) to be recalled for the next time the coil controller 2005 is activated. A stored value, such as a stored frequency value, may be implemented to facilitate operations of the wireless power circuitry compatibility. The value of the aforementioned frequency may be stored as a representation of the new frequency, e.g., in hertz or its period in seconds, or it may be stored as some new value which represents that of the component altered for the frequency change, e.g., the new resistance of an adjustable element, such as, for example, a digital potentiometer. The value of the aforementioned frequency may also be stored as a value which represents that required to adjust some component to achieve the new frequency (e.g. the voltage required to adjust a digital potentiometer). An indicator, such as a diode or light on the sensor unit 1000b shows power-connectivity strength, such as, for example, by changing hues from green (good connection) to red (bad connection).

The embodiments of the controller unit 1000a contain a voltage regulator 2000 which provides power for the controller circuitry 3010. The regulator 2000 may receive power from an external means of an electrical socket, an internal battery, replaceable and rechargeable by the user, or by wireless power transmission. The regulator 2000 comprises circuitry which regulates voltage and current to proper amounts in order to appropriately provide power to respective components that require it. For example, the following components may receive voltage regulated power via the regulator 2000, among which include: V1: Coil Controller, V2: Sensor Communication Antenna, V3: Send/Receive Antenna, V4: Display Screen. (see FIG. 2)

The computer/chip module 2002, depicted in FIG. 2 may be comprised of circuitry that is programmable by software. Microcircuitry, microprocessors, microcontrollers or embedded logic, are examples of circuitry or circuit components that may be provided with instructions for processing, storing, and/or communicating information, and which may comprise the computer chip or module 2002. The software may contain instructions to communicate with sensor unit 1000*b* (shown in FIG. 4) and the relevant components contained therein, including but not limited to a separate computer/chip module 2010 and a sensor 2008 of the sensor unit 1000*b* and circuitry 3009. The sensor 2008 preferably is a humidity sensor that is equipped to measure characteristics of its surroundings such as humidity, as well as, according to preferred embodiments, temperature, and light penetration. The computer module 2002 may also contain software that includes instructions for sending and receiving data to an external computing device 1001 through wireless means, facilitated by an antenna 2003, as well as instructions to process incoming data requests from the devices. The computer module 2002 may also contain instructions to process data received from the sensor unit 1000*b*, facilitated by a dedicated sensor communication antenna 2004. Antennas also may be configured comprising or associated with transceivers for receiving and communicating information and/or data. Embodiments also include a computer module 2002 that is configured with the capability to record and store data, including data and/or other information received from the sensor unit 1000*b* and from devices that connect and interact with the controller unit 1000*a*, including but not limited to a computing device 1000 or a network switch 1003. For example, the data may include user-settings, the local and external IP address of the device 1000 when connected to a network switch 1003, and logs of data from sensor unit 1000*b*, for example. The computer module 2002 may also contain instructions to interact with a power controller 2005. The interactions include the ability to monitor real-time characteristics of the controller 2005 such as power consumption and oscillation frequency, for example, as well as the ability to alter characteristics of the circuits that are regulated by the controller 2005, including the circuitry embodied by controller 2005.

The computer module 2002 may also interact with servers or web applications hosted through the internet 1004 via the network switch 1003 (FIG. 1). Referring again to FIG. 1, an external computing device 1000 may interact with the data servers or web applications via the internet 1004 by running a compatible software application.

Upon the receipt of a data-request from an external computing device 1001, the sensing device 1000 may enter a "live" state and leave a previous "sleep" state. In the contents of the request, instructions will be contained that describe what the computing device 1001 is requesting, and the computer module 2002 will comply and perform actions based on the received instructions. For example, instructions may include an operation, such as an instructions to change settings (monitor-interval, IP address, etc.), instructions to pull telemetry data, stored or real-time, or another function. The device 1000 may also periodically check via the internet 1004 whether a computing device has an unacknowledged request and will perform actions based on the unacknowledged request.

Referring to FIG. 3, according to an exemplary embodiment, the communications circuitry 3009 of the sensor unit 1000*b* is shown comprising a voltage regulator 2011, a computer/chip module 2010, an antenna 2013 for wireless communication exchanges with a computer module 2002 in the controller unit 1000*a*. Alternatively, or solely with said component, a wireless power receiver component 2009, a power rectifier component 2012, and a sensor 2008. The embodied power receiving component 2009 of the sensor unit 1000*b* may provide power to the sensing component circuitry 3009 via wireless inductance between the power transmission component 2006 of the controller unit 1000*a* shown in FIG. 2.

Alternatively, the power receiving component 2009 may contain circuitry which allows it to be compatible with an existing wireless power standard as a receiving component to receive power for the sensor unit 1000*b*. Referring to FIGS. 4 to 5, an exemplary implementation of the invention according to an embodiment that includes a monitored containment that is monitored for humidity (i.e., hygroscopic conditions). The device is configured as a container shown having a containment space. Preferably, at least one wall forms the containment space, and in the embodiment illustrated, there are a plurality of walls, including a front wall, a rear wall, two side walls, a rear wall, a bottom, and a cover. The cover may also include walls that match the other walls. For example, the cover may include a top panel that has a front wall, rear wall and side walls that engage with the top of the respective containment walls. In addition, a sealing ridge also may be disposed around the perimeter of the upper edges of the containment walls to provide a seal when the cover is closed against the containment walls. The containment is depicted in an arrangement, but may be provided having different shapes and configurations.

Referring to FIGS. 4 and 5, the sensor unit 1000*b* is shown disposed within the containment space 1002*a*. The controller unit 1000*a* is shown disposed outside of said containment space 1002*a*. The sensor unit 1000*b* monitors the humidity (i.e., a hygroscopic condition) within the containment space 1002*a*. In the embodiment illustrated, the sensor unit 1000*b* is on the interior of the containment within the containment space, and the controller unit 1000*a* is disposed outside of the containment space. In the arrangement depicted, the controller unit 1000*a* wirelessly powers the sensor unit 1000*b*. The sensor unit 1000*b* includes circuitry that communicates wireless signals of the hygroscopic condition within the containment space based on the sensor detection. The sensing component 1000*b*, which is powered wirelessly, detects the humidity within the containment, the humidor 1002. The controller unit 1000*a* is shown situated on the outside of the containment space 1002*a*. The controller unit 1000*a* may be mounted on the containment wall 1002*b* (and may be removably mounted so it can be detached and attached as desired) using adhesive pads 3006 (FIG. 9). Alternatively, in place of adhesive pads, other suitable mounting elements may be used. The controller 1000*a* has circuitry that is configured to receive or exchange wireless communications between the sensor unit 1000*b*, the signals including wireless signals of the hygroscopic conditions that are detected by the sensor. The controller unit 1000*a* also may be configured to instruct the sensor unit 1000*b* when to detect the signals, and when to report the detected signals. In the embodiment illustrated, the detected signals represent the humidity condition within the containment, namely within the containment or humidor space 1002*a*. The controller unit 1000*a* is powered by a power source which may be any suitable power source, such as for example, a battery or supplied electrical power from an electrical utility, solar power (from a solar cell), wireless power, or other suitable power.

As shown in the exemplary embodiment, the controller unit 1000*a* is located on the containment side wall 1002*b*, on the outside of the containment space 1002*a*. In the exemplary embodiment, the sensor unit 1000*b* is located on the interior of the same side wall on which the controller it disposed but the sensor unit 1000*b* is positioned within the containment space 1002*a*. The controller unit 1000*a* preferably is removably mounted to the side wall 1002*b*. Although depicted on the side wall 1002*b*, according to some alternate embodiments, the controller unit 1000*a* may be mounted on another wall, bottom or top cover, and the sensor unit 1000*b* positioned on the interior thereof. According to some preferred embodiments, the sensor unit 1000*b* is removably mounted to at least one of the containment walls (or the cover or bottom).

According to an alternate embodiment, the sensor is disposed within one of the containment walls (or top cover or bottom). The sensor preferably includes at least a detecting portion the is exposed to the containment space.

The sensor and controller are designed to operate in conjunction with devices, such as a humidifier or dehumidifier. The circuitry of the sensor, controller or both may be configured to communicate with the humidifier or dehumidifier, and may provide instructions or inputs (humidity signal) in response to hygroscopic conditions within the containment that are sensed by the sensor. The humidifier or dehumidifier are configured to operate so that the hygrostatic condition within the containment (humidity) is regulated and controlled to a desired level. The humidifier or dehumidifier preferably include circuitry that operates the humidifier or dehumidifier (or both) in response to the conditions sensed with the sensor. According to some embodiments, the humidifier or dehumidifier includes a power source for powering its operations (i.e., distribution of humidity within the containment, or removal of humidity within the containment). According to some embodiments, the humidifier or dehumidifier is wirelessly powered to operate to deliver or remove humidity from the containment in response to a hygroscopic condition sensed by said sensor. The wireless power may comprise a controller situated to deliver wireless power to the humidifier or dehumidifier. According to some embodiments, the dehumidifier and humidifier may be provided as a unit. According to some other embodiments, the dehumidifier may be provided to operate the cover to open the cover to a slightly open position to allow humidity to escape, and close the cover, upon reaching the desired level of humidity as determined by the sensor.

Figure 14:
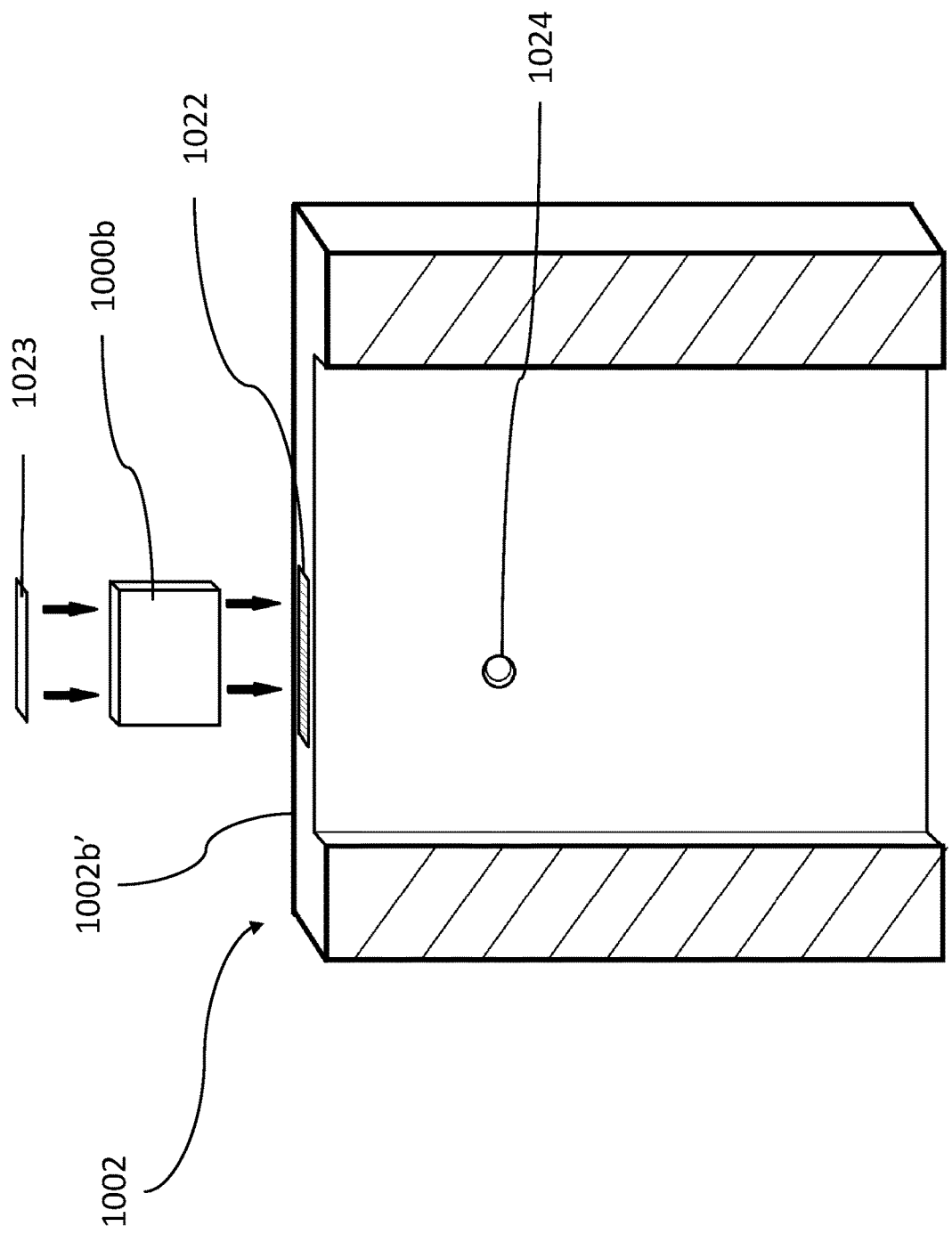
FIG. 14 is a sectional view of an alternate wall configuration of a humidor wall, as viewed in a similar view to the wall section taken along the section line 5-5 of FIG. 4.

Although shown disposed on the interior of a wall 1002*b*, according to alternate embodiments, the sensor unit 1000*b* may be situated within the wall 1002*b* (in whole or part) with at least the detecting portion of the sensor (the location of the sensor where the humidity is sensed) communicating with the containment space 1002*a*. For example, as illustrated in FIG. 14, there is shown an alternate embodiment of the humidor wall 1002*b*' (similar to the wall 1002*b* shown in FIGS. 4 and 5), having a slot 1022 therein for receiving the sensor therein, such as the sensor unit 1000*b*. A slot cover 1023 may be provided to cover the slot, and may be flush with the wall surface to provide the sealing between the container or humidor 1002 and the top of the humidor 1002. The slot cover 1023 may be made from wood or other suitable material to provide the sealing or consistency with the top portion of the humidor wall that engages the humidor cover. An opening 1024 in the wall 1002*b*' is present in order to provide an aperture for sensor 2008 to monitor the conditions of the humidor.

Figure 6:
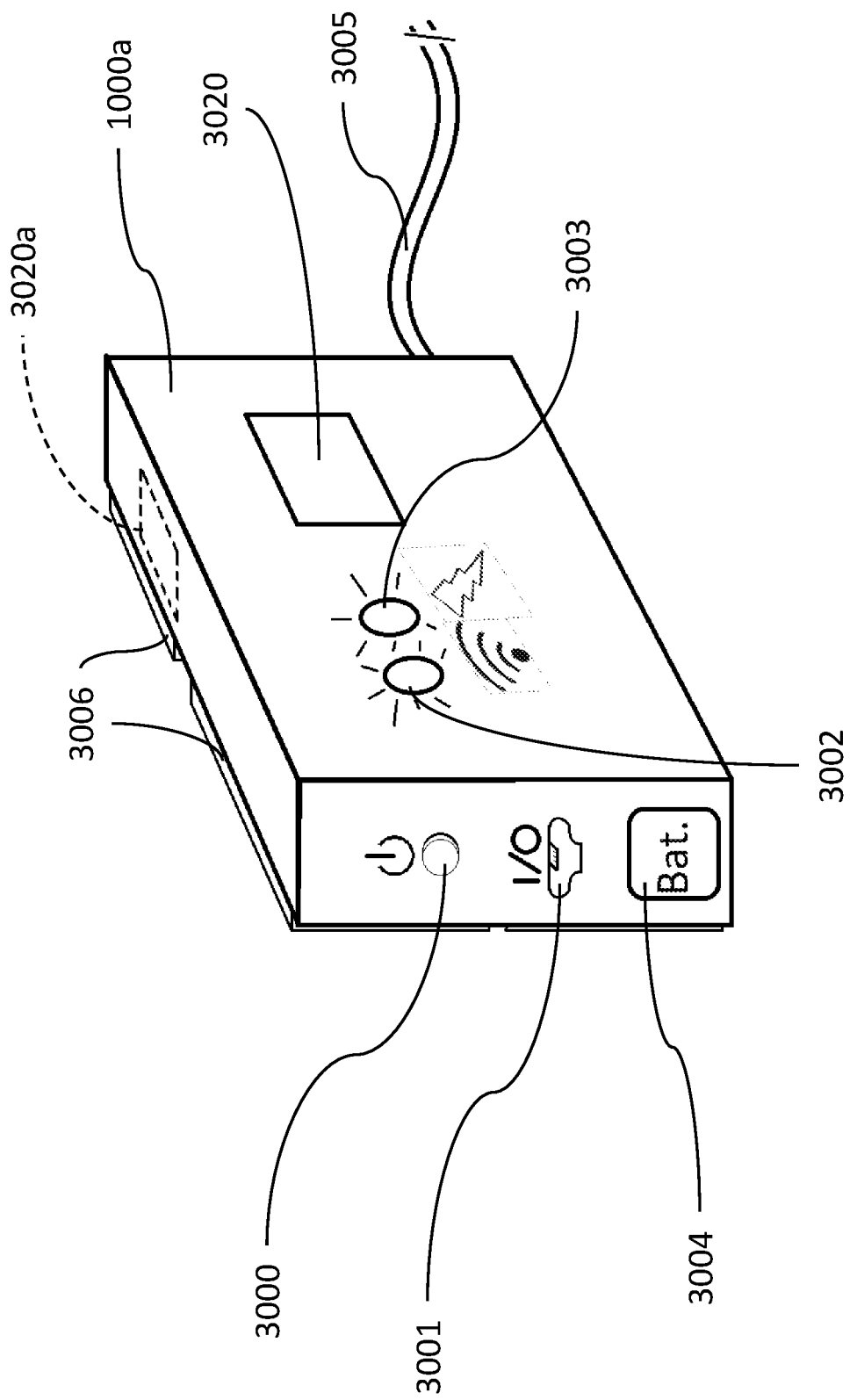
FIG. 6 is a perspective view of the controller unit.

Referring to FIG. 6, an exemplary embodiment of the controlling component or controller unit 1000*a* is shown. As described, the controller unit may be powered via a power input in the form of input from an electrical adapter 3005 or battery provided in a battery compartment 3004. The battery compartment 3004 may be situated at the bottom of the device for better center-of-mass stability. On the front wall of the controller unit 1000*a* there is a display screen 3020.

The display screen 3020 may be an LCD, LED, or OLED screen, or other suitable display. The display screen 3020 preferably is provided to display information, such as for example, some or all of the following: 1. telemetric data from the sensing component 1000*b*, 2. device information (i.e. time running, user info, or network information), 3. internet connection information (i.e. IP address, port info), 4. device and telemetric statistics, and 5. user account information. Alternatively, the location represented by 3020*a* is an alternative placement of the screen shown on the top of the controller unit 1000*a*, which may allow for more convenient user interaction. The device 1000 may operate in a mode without the need for further computing devices, or both local mode and data transmission or remote mode. In the local mode, the device 1000 may display the information about the condition being monitored, such as the humidity of the humidor 1002, by providing that information on the display, such as the display 3020. There are also several buttons or controls on the device which allow for user-interaction directly at the device (e.g., local operation), separate from interacting with the device 1000 through an external computing device 1001.

Figure 7:
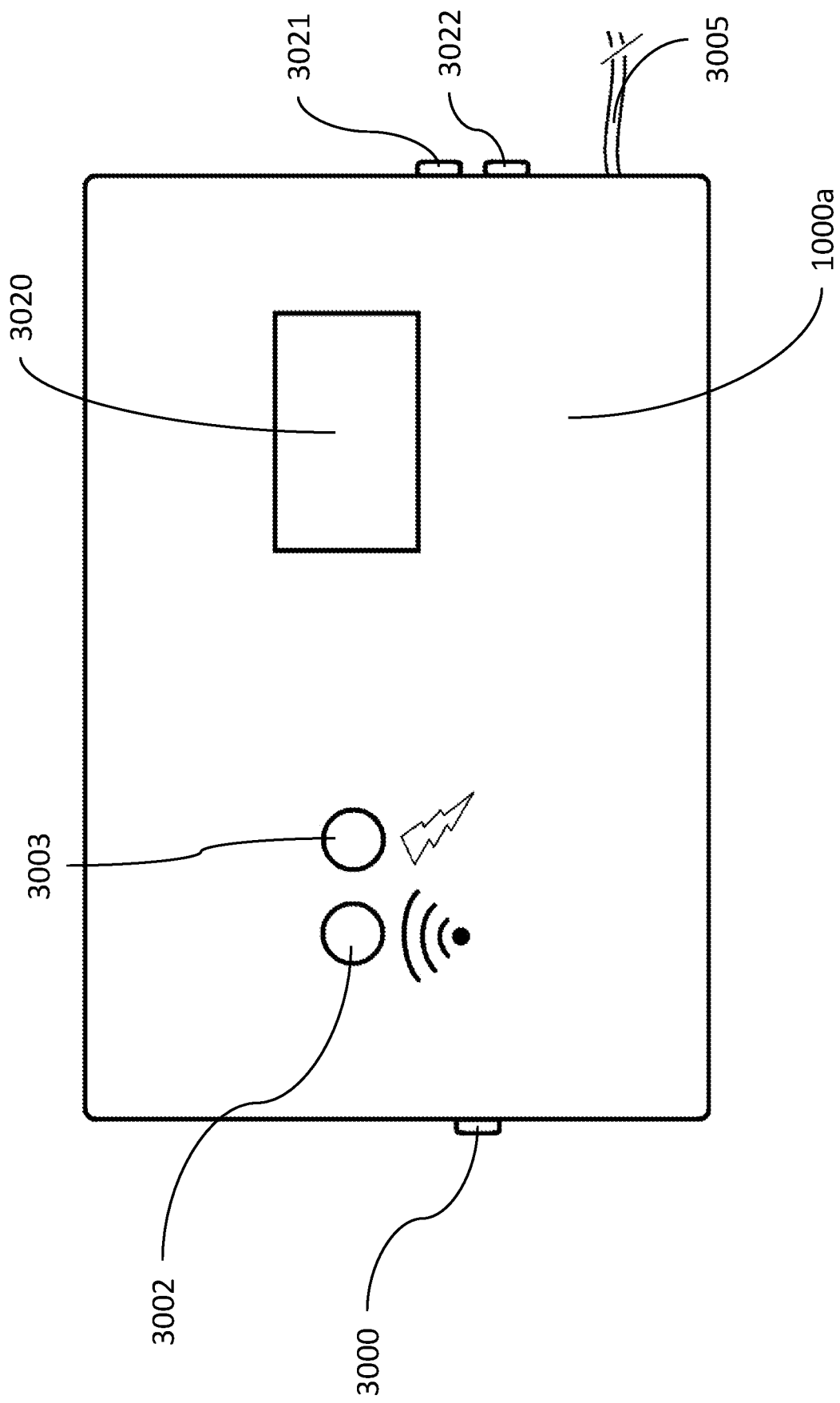
FIG. 7 is a front elevation view of the controller unit.

As represented in FIGS. 6 to 9, the controller unit 1000*a* has several controls, shown comprising buttons 3000, 3021, 3022 (FIG. 7). The power button 3000 allows the user to toggle the device 1000 on or off. The refresh button 3021 (FIG. 7) allows the user to immediately read data from the sensing component 1000*b* if it is setup to sense data on timed intervals. The refresh button 3021 also allows for the manual refresh of data from the internet 1004 if it has not automatically been refreshed by the device 1000 (i.e. name change for device, settings change, etc.). A reset/config button 3022 is also situated on the outside of the controlling component 1000*a*. When pressed, the device 1000 will enter a configuration or setup mode where the user can connect to the device 1000 via WiFi or Bluetooth to perform a setup. Additionally, the button 3022 may have a second function, such that it is held (i.e., depressed) for an amount of time, the button 3022 may act as a reset button for the purpose of resetting the device 1000 to factory settings and removing user-data including SSIDs, passwords, and telemetric data.

As represented in FIG. 6, a port 3001 for direct serial communication to the device 1000 is shown. The user may read data from the device 1000 or configure the device through a direct connection via the port 3001 via an external computing device 1001.

Further shown in FIG. 6 are status indicators, comprising lights 3002 and 3003. The WiFi status light 3002 is used to indicate WiFi connectivity, data sending/receiving, and device pairing status. The sensor power status light 3003 is used to indicate that the power transmission component 2006 is being powered and wireless power is being sent to the sensing component 1000*b*.

As illustrated in FIG. 10, the sensor unit 1000*b* shown having a housing 1014 that contains the sensor 2008 and the circuitry 3009 therein. A mount, such as the adhesive pads 3008, similar to the adhesive pads 3006 on controller unit 1000*a* are shown provided on the rear surface 1005 of the sensor unit 1000*b*. Although illustrated as adhesive pads 3008, the mounting mechanism may in addition or alternatively, comprise magnets, or metal instead for creating a magnetic connection with the outer pads 3006. In FIG. 10, a power status light 3011 is shown, and is provided to indicate the relative strength of the wireless power connection. The status light 3011 may show a change indicative of a condition. For example, the status light 3011 may have a peak lumens output when the sensor unit 1000*b* is receiving sufficient power, or may shift from red to green to indicate the same criterion or status condition. The power status light 3011 is preferably utilized during initial setup of the device if the device is not utilizing orientating magnetic connectors as 3006 and 3008. The indicator, i.e., status light 3011, may also be in use whenever the sensing component 1000b is being powered during use.

Also represented in FIGS. 10 and 11 is a shell opening aperture 3007, which allows moisture into the housing 1014 of 1000b for sensing. Additionally, the sensor 2008 of circuitry 3009 may be sealed against shell hole 3007 to prevent moisture from entering the housing 1014. Shell holes 3007a, 3007b, 3007c are optional holes to allow more entrance points for air samples to be measured.

Setting Up a Telemetry Connection

Figure 15:
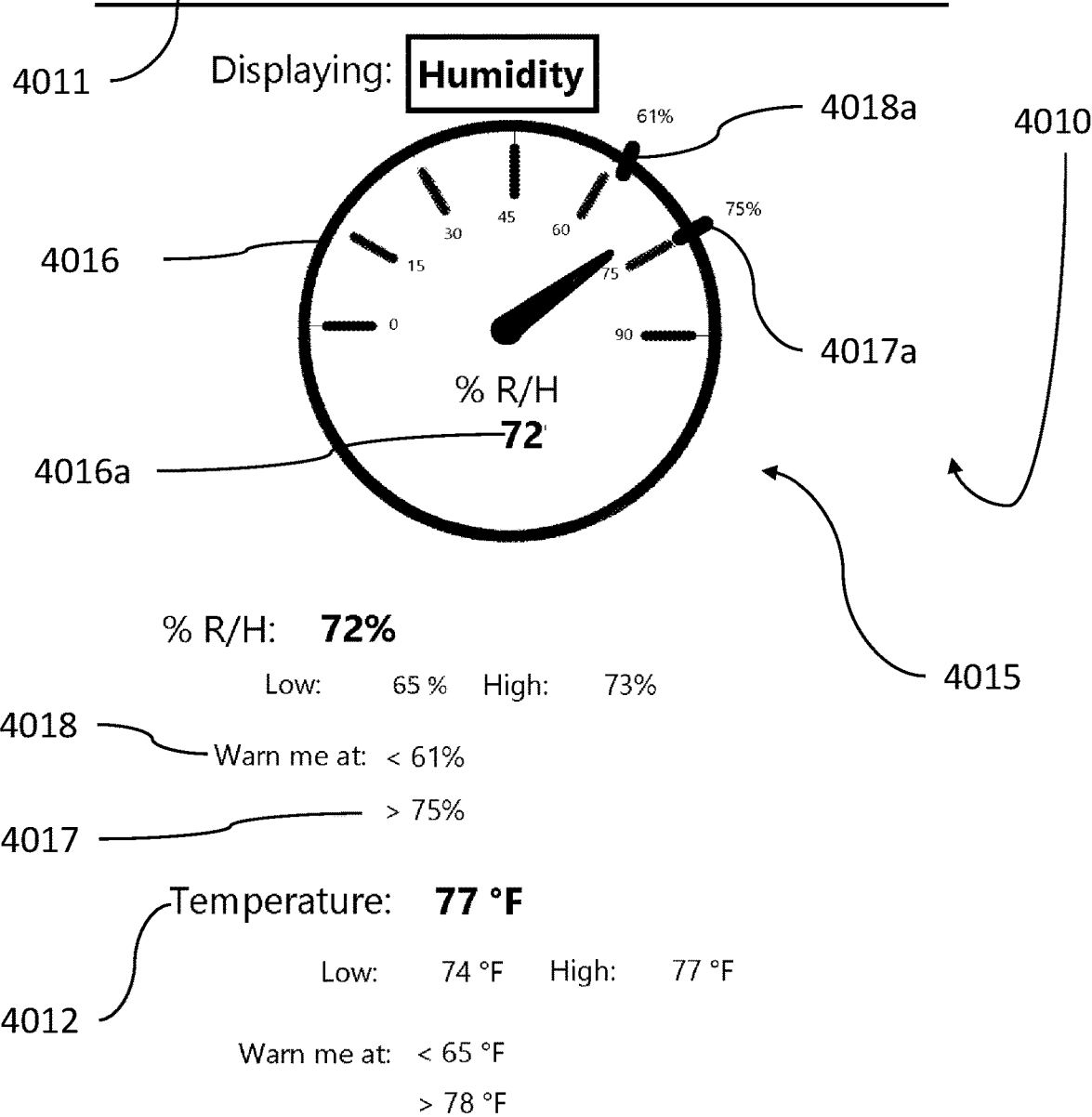
FIG. 15 is an exemplary illustration of an application screen shown displayed on a device, such as a smartphone, for viewing sensor data.

The user may navigate to the telemetry display page, as shown in FIG. 15, via an external computing device 1001 (FIG. 1). In the exemplary depiction, the screen display 4010, is shown depicting a name field "Cellar Humidor" 4011. Telemetry may be displayed as information group 4015, through visual means such as a graphic display, such as a gauge 4016, or through means of text. If a gauge 4016 is implemented/visible, the value it represents may also be concurrently displayed by means of text 4016a, in conjunction with the gauge 4016. In addition to populating the display page or screen 4010 with data, humidor telemetry data may be asynchronously collected/gathered, if a telemetry connection has been set up by the user, and used to populate information group 4015. Depending on if and how telemetry data could not be sourced (whether within a timeframe or), a notification or visual alert/text will notify the user the reason for lack of a telemetry connection. In the case that telemetry has not been set up for the respective humidor, the aforementioned notification will encourage the user to set up a telemetry connection. In the case of lack of connection, the aforementioned notification will inform the user of such.

The gauge 4016 may also be configured to display other measurements or statistics (i.e. temperature 4012) by utilizing a selector to choose what to display. Additionally, the user may set upper and lower bounds 4017, 4018 for warnings or notifications if the measurement is out of range which can be visually represented on the gauge as 4017a and 4018a, respectively.

A method for initializing the telemetry screen FIG. 15 may be performed in accordance with instructions provided entirely, or in part, generated by the software and displayed on the screen for a user to follow. The telemetry connection may be established through WiFi, internet, Bluetooth, or other means of wireless communication, the preferred connection type being dependent on which method may be most suitable at the time. Different wireless connections are illustrated in FIG. 1, each of which preferably includes a computing device 1001, and the sensor device 1000 which communicate with each other. In accordance with some embodiments, the method may be carried out where a computing device, such as for example, the computing device 1001, establishes a connection, e.g., through means of an Internet connection 1004, to the sensor device 1000. In accordance with some embodiments, the computing device 1001 may establish a connection with the sensing device 1000 through means of WiFi over a LAN. In accordance with some other embodiments, the computing device 1001 may establish a connection with the sensor device 1000 through a direct wireless communication, such as Bluetooth or RFID. The system is configured so that the sensor device 1000 may establish a connection, which preferably may be an asynchronous connection, with the computing device 1001. Upon a successful connection being made between the computing device 1001 and the device 1000, data may be pulled or otherwise obtained from the device 1000. The data may be stored and processed, and preferably, the data is used to populate the telemetry screen, as depicted in the exemplary screen display represented in FIG. 15. Using a selector, such as a button on the computing device, or on the display screen 4010 (e.g., a touch screen), the user may switch the graphic representation of hygrometer data between humidity, temperature, or other values that are being measured or determined by the system or device 1000.

The user may change telemetry settings The user may set bounds for out-of-range values for temperature and humidity, through settings items 4018 and 4017, respectively.

In accordance with some embodiments, a telemetry system is provided for communication between a first location and a second or remote location. The first location preferably comprises the location at which the sensing component is located, such as, for example, at the humidor to be monitored. According to an exemplary embodiment, the humidor 1002 is illustrated in an arrangement with computing components, for communicating information. The humidor 1002 is illustrated with the device 1000, and according to the embodiment illustrated, the device 1000 is shown carried on the humidor 1002. The humidor 1002 is also represented by its sub-parts: a lid 1002g and the container/shell. In the exemplary embodiment, the humidor 1002 is shown including a pair of side walls 1002b, 1002c, 1002d and 1002e, a bottom 1002f, and top or cover. The sensing device includes circuitry for detecting one or more conditions, and preferably conditions within the humidor, such as, for example, relative humidity, temperature, light penetration. The device 1000 preferably is arranged to detect humidity and/or temperature and provide the information to a remotely situated component, such as, for example, a computing device 1001. The computing devices are depicted as a smartphone 1001a, tablet 1001b, personal computer 1001c. The computing components of one or more or both of the sensor 1000b or controller 1000a have communications circuitry that communicates to receive and/or exchange information with a computing device, such as the smartphone 1001a. While the invention is described through the above-described exemplary embodiments, it will be understood by those of ordinary skill in the art that modifications to, and variations of, the illustrated embodiments may be made without departing from the inventive concepts disclosed herein. Embodiments of the system and devices provide a sensor electronically coupled with a first coil to receive power from a compatible second coil (controller coil), and the sensor also may display the sensor readouts on a display. Preferred embodiments are implemented with or may be configured as a humidor. Optionally, there is wireless communication in the sensor that is configured to communicate the sensor information for readout on a device, which may be a device other than the optional sensor display. The sensor is placed within a containment, and the controller coil outside of the containment, or in some operably spaced apart manner (i.e., within the coil radiance or signal range) from the sensor. According to some implementations and embodiments, a containment may include two compartments, one for a coil controller and the other for a sensor. For example, the coil controller and sensor could be in a containment but separated by a wall or panel.

For example, although some aspects of the system and method have been described with reference to a flowchart and/or screen display interfaces, those skilled in the art should readily appreciate that functions, operations, decisions, etc. of all or a portion of each block, or a combination of blocks, of the flowchart or interface displays may be combined, separated into separate operations or performed in other orders. In addition, features, operations, steps, and embodiments, although described or referenced in connection with one embodiment, may be combined or implemented in conjunction with one or more other features, operations, steps, or embodiments. According to some alternate embodiments, the coil controller itself may alternatively be configured with circuitry so that it is powered wirelessly by a coil. The exemplary illustrations and depictions describe preferred embodiments, and variations of the embodiments, features, steps and operations may be implemented consistent with the invention.

Moreover, while the embodiments are described in connection with various illustrative data structures, one skilled in the art will recognize that the system may be embodied using a variety of data structures. Accordingly, the invention should not be viewed as being limited to the disclosed embodiments.

What is claimed is:

1. A hygroscopically monitored containment having a containment space, at least one wall forming said containment space, a sensor disposed within said containment space, a controller disposed outside of said containment space, wherein said sensor monitors a hygroscopic condition within said containment space, and wherein said controller wirelessly powers said sensor, the sensor including one or more associated electronic components, and wherein said controller wirelessly powers said sensor and said one or more associated electronic components by generating power from outside of the containment space and transmitting said power through said at least one wall; wherein said one or more associated electronic components are continuously wirelessly powered; and wherein said sensor and said one or more associated electronic components are operable without a battery;

wherein the sensor includes sensor circuitry including a power receiving component that comprises a power receiving coil and a computer/chip module, wherein the controller includes a power transmission coil and wherein the controller is configured to alter the power transmission coil to establish a data connection with the sensor, wherein altering the power transmission coil comprises altering an oscillation frequency in positive or negative increments until the data connection is established;

wherein upon establishing the data connection after having altered the oscillation frequency, saving the altered oscillation frequency as a new oscillation frequency by storing the new oscillation frequency to the computer/chip module, and recalling the new oscillation frequency for subsequent activation of the controller.

2. The containment of claim 1, wherein said sensor communicates wireless signals of the hygroscopic condition within the containment space.

3. The containment of claim 2, wherein said controller is configured with circuitry to wirelessly communicate with the sensor to receive wireless communications from said sensor, which include said wireless signals of the hygroscopic condition.

4. The containment of claim 3, wherein said controller is powered by a power source comprising a battery or supplied electrical power.

5. The containment of claim 3, wherein said controller is located on the at least one containment wall and on the outside of said containment space where said sensor is located, and wherein said sensor is located on the containment wall and within the containment space.

6. The containment of claim 5, wherein said controller is removably mounted to the at least one containment wall.

7. The containment of claim 5, wherein said sensor is removably mounted to the at least one containment wall.

8. The containment of claim 6, wherein said sensor is removably mounted to the at least one containment wall.

9. The containment of claim 3, wherein said sensor is disposed within the at least one containment wall.

10. The containment of claim 9, wherein said sensor includes at least a detecting portion that is exposed to the containment space.

11. The containment of claim 3, including at least one or more of a humidifier or dehumidifier.

12. The containment of claim 11, wherein at least one of said controller is configured to communicate with the at least one or more humidifier or dehumidifier in response to a hygroscopic condition sensed by said sensor.

13. The containment of claim 12, wherein the containment space has a hygrostatic condition, and wherein said sensor, controller and the at least one or more humidifier or dehumidifier are configured to control the hygrostatic condition within the containment.

14. The containment of claim 13, wherein said sensor includes sensor circuitry, wherein said controller includes controller circuitry, and wherein the at least one or more humidifier or dehumidifier includes circuitry.

15. The containment of claim 14, wherein the at least one or more humidifier or dehumidifier is wirelessly powered to operate to deliver or remove humidity from the containment in response to a hygroscopic condition sensed by said sensor.

16. The containment of claim 3, wherein said controller is wirelessly powered by a wireless power source.

17. The containment of claim 1, wherein the sensor includes a power receiving component.

18. The containment of claim 17, wherein said sensor includes circuitry and one or more of an antenna or transceiver for sending and receiving data.

19. The containment of claim 18, wherein said circuitry comprises a Wi-Fi enabled communications transceiver.

20. The containment of claim 2, wherein said sensor is configured to issue a wireless communication of the hygroscopic condition within the containment space, wherein said wireless communication is transmitted by said sensor in a communications protocol for receipt by a computing device.

21. The containment of claim 1, wherein said one or more wirelessly powered associated electronic components comprises a display.

22. The containment of claim 1, wherein said one or more wirelessly powered associated electronic components comprises a humidifier.

23. The containment of claim 3, wherein the controller is configured to generate an inductive current by sending an amplified AC signal through the circuitry and wherein the frequency of said AC signal is matched to the resonant frequency of the circuitry.

24. The containment of claim 23, wherein said one or more associated electronic components are configured to be continuously wirelessly powered by the matched frequency of the controller.

* * * * *